United States Patent [19]

Dubost

[11] Patent Number: 5,330,303
[45] Date of Patent: Jul. 19, 1994

[54] DEVICE FOR FASTENING AT LEAST TWO MEMBERS TO EACH OTHER

[75] Inventor: Dominique Dubost, La Celle Saint Cloud, France

[73] Assignee: Tech Industries, Chezal-Benoit, France

[21] Appl. No.: 30,256
[22] PCT Filed: Jul. 24, 1992
[86] PCT No.: PCT/FR92/00737
  § 371 Date: Apr. 30, 1993
  § 102(e) Date: Apr. 30, 1993
[87] PCT Pub. No.: WO93/03285
  PCT Pub. Date: Feb. 18, 1993

[30] Foreign Application Priority Data

Jul. 26, 1991 [FR] France .................. 91 09538

[51] Int. Cl.⁵ .................................. F16B 21/00
[52] U.S. Cl. .................................. 411/344; 411/21; 411/345
[58] Field of Search ............. 411/21, 22, 55, 340, 411/344, 345

[56] References Cited

U.S. PATENT DOCUMENTS

| | | | |
|---|---|---|---|
| 499,444 | 6/1893 | Schumann | 411/344 |
| 3,403,594 | 10/1968 | Newell | 411/344 |
| 4,553,889 | 11/1985 | Le Dantec et al. | 411/344 X |

FOREIGN PATENT DOCUMENTS

| | | | |
|---|---|---|---|
| 1123325 | 9/1956 | France | 411/345 |
| 1429545 | 1/1966 | France | . |
| 2351297 | 5/1977 | France | . |
| 571915 | 1/1958 | Italy | 411/345 |

Primary Examiner—Neill R. Wilson
Attorney, Agent, or Firm—Sughrue, Mion, Zinn, Macpeak & Seas

[57] ABSTRACT

A device for securing at least two elements together by means of a screw (3) and a transfer nut (4) adapted to be engaged in the recesses (1a, 2a) of said elements (1, 2) is characterized in that the transfer nut (4) includes a nut plate (6) having a threaded hole (7), on either side of which are located areas (8, 9) for the passage of the arms (10, 11) of a fastening unit (12) having a generally flare-shaped U cross section. The intermediate portion (13) of the latter includes a hole for the passage (14) of the screw (3) opposite the threaded hole (7) of the nut plate (6) and is adapted to be applied against a stop surface of the screw (3) or of the element (1) on which said screw rests, such that the nut plate causes the arms (10, 11) of the fastening unit (12) to be spaced apart and abuts on a contact surface of the other element (2) during screwing, in order to secure the elements together.

5 Claims, 2 Drawing Sheets

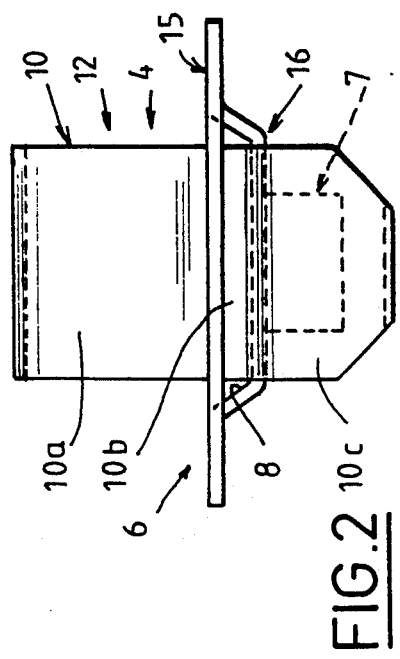
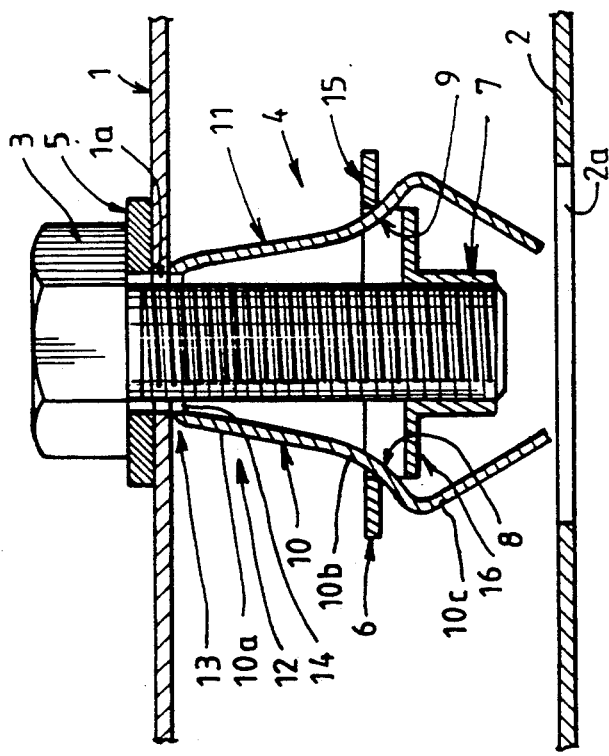
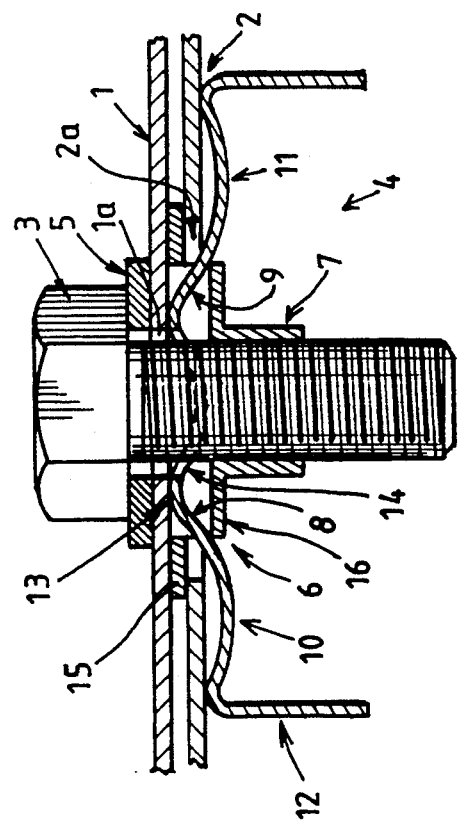

DEVICE FOR FASTENING AT LEAST TWO MEMBERS TO EACH OTHER

BACKGROUND OF THE INVENTION

The present invention relates to a device for fastening at least two members to each other.

More particularly, the invention relates to devices for fastening two members using a screw and a transfer nut which are adapted in order to engage in recesses in the said members.

Devices of this type are already known in the state of the art, for example from document FR-A-2,351,297, in which the transfer nut is fixed to the end of branches of a fastening member, these branches being deformable during tightening of this nut onto the screw in order to abut against a bearing surface of one of the members in order to hold this nut in position and to fix the members together.

However, these devices have a number of drawbacks, owing to the complexity of their structure and to their cost.

A cap nut is also known in the state of the art, for example from document FR-A-1,429,545, consisting of a body forming the nut proper, which is internally threaded, and by an elastic cage of small thickness, characterised in that the cage has expandable elastic lugs arranged and shaped so as to engage in recesses or notches made in a flange of the body of the nut and to produce anchoring on the edge of the hole by virtue of the axial displacement of this body of the nut when the latter is tightened, the point of curvature of the tabs carried by the cage being situated towards the outside at a distance from the hole of the cage intended for the screw such that the tabs are inclined and diverge in the direction of the body of the nut, the diameter of their periphery being, in the untightened state, tests less than the diameter of the hole.

However, this cap nut has a number of drawbacks, because it does not remain in position when the screw is removed.

SUMMARY OF THE INVENTION

The aim of the invention is therefore to solve these problems by providing a fastening device which is simple, reliable, easy to use, and whose cost price is as low as possible.

For this purpose, the subject of the invention is a device for fastening at least two members to each other, using a screw and a transfer nut which are adapted to engage in recesses in the said members, characterised in that the transfer nut comprises a nut plate comprising a tapped hole, on either side of which are made zones for passage of two branches of an attachment member with a cross-section of general flared U shape, whose intermediate portion comprises a hole for the screw, facing the tapped hole in the nut plate, and is adapted to bear against a stop surface of the screw or of the member on which this screw bears, so that the nut causes a separation of the branches of the member their abutment against a bearing surface of the other member during screwing, in order to fasten the members to each other.

Advantageously, the nut plate comprises two axially offset portions, an internal one in which the tapped hole is made, and an external one extending at least partly around the internal portion and adapted to abut against a bearing surface of the other member, opposite to that against which the branches of the attachment member abut, in order to allow positional holding of the nut by pinching of the other member between this external portion of the nut plate and the branches of the attachment member.

According to one embodiment, in the untightened position of the nut, each of the branches of the attachment member has, in succession from the intermediate portion of the latter, a first straight part moving away from the axis of the nut, a second part curved in the opposite direction from the axis of the nut and engaged in a corresponding passage zone of the nut plate, and a third part which is folded in the direction of the axis of the nut.

The invention will be better understood with the aid of the following description which is given solely by way of example and is made with reference to the attached drawings, in which:

BRIEF DESCRIPTION OF THE DRAWING

FIG. 1 represents a sectional view of a fastening device according to the invention, in the untightened position of the screw;

FIG. 2 represents a side view of the nut represented in FIG. 1;

FIG. 3 represents a sectional view of a fastening device according to the invention, in the tightened position of the screw.

DESCRIPTION OF PREFERRED EMBODIMENTS

Figure 4:
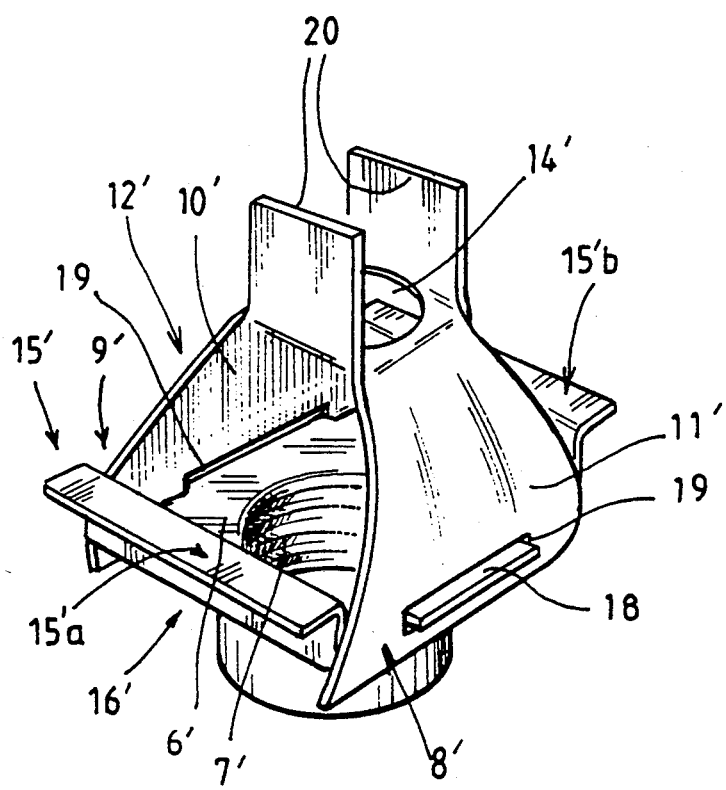
FIG. 4 represents a perspective view of a variant embodiment of a nut forming part of a fastening device according to the invention.

As can be seen in FIGS. 1 to 3, a fastening device according to the invention may be used for fastening two members to each other, these members being designated by the general references 1 and 2 in these figures.

These members are for example in the form of panels.

The fastening device according to the invention comprises, in a manner which is known per se, a screw 3 and a transfer nut 4.

This screw and this nut are adapted in order to engage in recesses 1a, 2a respectively in the members 1 and 2. The screw 3 may for example be associated with a washer 5 bearing on a corresponding face of one of the members.

According to the invention, and as can be seen in these figures, the transfer nut 4 comprises a nut plate 6 comprising a tapped hole 7, on either side of which are made zones for passage or branches 10 and 11 of an attachment member 12 with a cross-section of general flared U shape, whose intermediate portion 13 comprises a passage hole 14 for the screw, facing the tapped hole 7 in the nut plate.

As can be seen in particular in FIGS. 1 to 3, this intermediate portion 13 of the attachment member 12 is adapted in order to Dear against a stop surface of the screw, consisting for example of the washer 5, or of the member 1 on which this screw bears, so that the nut causes a separation of the branches 10, 11 of the attachment member and their abutment against a bearing surface of the other member 2, during screwing, in order to fasten the members to each other as will be described in more detail in the rest of the description.

In the embodiment represented in these FIGS. 1 to 3, the nut plate 6 comprises two axially offset portions 15 and 16, an internal one 16 in which the tapped hole 7 is made, and an external one, 15, extending around the internal portion, the passage zones for the branches of the attachment member being formed, in this embodiment, by the slots 8 and 9 made between these two portions.

In the embodiment illustrated, in the untightened position of the nut, each of the branches, for example branch 10, of the attachment member 12 has, in succession from the intermediate portion 13 of the latter, a first straight part 10a moving away from the axis of the nut, a second part 10b curved in the opposite direction from the axis of the nut, this part being engaged in a corresponding slot 8 of the nut plate 6, and finally a third part 10c which is folded in the direction of the axis of the nut.

Advantageously, this third part of each branch of the attachment member is folded approximately through 90° with respect to the corresponding end of the second part of the latter.

This device is assembled for example in the following manner.

The screw 3 is first introduced into the recess 1a of the member 1, so that the bearing washer 5 or the head of the screw 3 comes into contact with the corresponding face of this member.

Next, the transfer nut 4 is arranged around this screw 3, so that the intermediate portion 13 of the attachment member 12 abuts against the corresponding face of the member 1 or of the bearing washer 5 (or directly of the head of the screw if the latter is not associated with a washer), according to the size of the recess 1a of the member 1.

This member 1 / screw 3 / nut 4 assembly is next moved so that the transfer nut 4 is introduced into the recess 2a in the member 2 to be fastened, and so that the two members are pressed flat against each other.

It should be noted in this context that the external portion 15 of the nut plate 6 is interposed between the two members in order to form for example a spacing member and abuts against a bearing surface of the second member 2, which is opposite the one on which the branches of the attachment member bear.

Once this position has been reached, it is then sufficient to turn the screw 3 in order to make the nut 7 rise along the latter, which causes the separation by deformation of the branches 10 and 11 of the attachment member 12 until these latter, and more particularly the zones of folding between the second parts and third parts of these latter, abut against the corresponding face of the member 2 in order to ensure the fastening of these members to each other.

It should be noted that the first member 1 may advantageously comprise means for locking the attachment member or the nut plate in position, preventing these latter from turning during the rotation of the screw 3. These locking means consist of any appropriate means, such as for example a projecting part of this member.

During disassembly, it is sufficient to withdraw the screw, the transfer nut 4 remaining in position on the second member 2 by pinching of the latter between the external portion 15 of the nut plate 6 and the corresponding parts of the branches 10 and 11 of the attachment member 12.

The nut plate 6 and the attachment member 12 may be made by shearing and press-forming sheet metal.

According to another embodiment represented in FIG. 4, the external portion 15' of the nut plate 6' of an attachment member 12' comprises two opposite fins 15'a and 15'b, which are angularly offset (for example by 90°) with respect to the passage zones 8' and 9' which are formed over corresponding opposite lateral sides of the nut plate 6' between the fins 15'a and 15'b for the passage of deformable branches of 10' and 11' of the attachment member 12'.

These fins 15'a, 15'b make it possible always to hold the nut plate 6' in position on the second member 2 (see FIGS. 1 and 2) by pinching of the latter between external portion 15 of the nut plate and the deformable branches 10', 11' of the attachment member 12'.

In this embodiment, the branches of the attachment member are adapted in order to interact in the passage zones 8' and 9' with the corresponding edges of the internal portion 16' of the nut plate 6', during screwing, for their deformation.

The internal portion 16' is axially offset from the external portion 15', and contains a tapped hole 7'. The nut plate 6' has a pair of flanges 18 which are angularly offset by 90° from the fins 15'a, 15'b, and which, in the untightened position, are retained in a corresponding pair of slots 19 formed in the deformable branches 10' and 11', respectively, of the attachment member 12'. At the top of the attachment member 12' are a passage hole 14', for the screw 3 (see FIGS. 1 and 2), and two upstanding flanges 20 which form abutting surfaces for the head of the screw.

The operation of the attachment member 12' is similar to that of the embodiment of FIGS. 1–3. After the attachment member 12' is assembled with a screw and inserted through the two members (panels) 1 and 2 as illustrated in FIGS. 1 and 2, and when the screw 3 is rotated in the screwing direction, the nut plate 6' moves in the direction toward the top (as viewed in FIG. 4) of the attachment member 12', thereby causing the flanges 18 of the nut plate to disengage from the slots 19 of the deformable branches 10', 11' and to act against these branches to outwardly deform them outwardly and upwardly and to press them against the rear face of the member (panel) 2 which, in turn, ultimately is pinched between the fins 15'a and 15'b and the deformable branches 10', 11' of the attachment member 12'.

What is claimed is:

1. Device for fastening at least two members to each other, using a screw (3) and a transfer nut (4) which are adapted in order to engage in recesses (1a,2a) in the said members (1,2), characterised in that the transfer nut (4) comprises a nut plate (6) comprising a tapped hole (7), on either side of which nut plate are zones (8,9) for passage of branches (10,11) of an attachment member (12) with a cross-section of general flared U shape, whose intermediate portion (13) comprises a passage hole (14) for the screw (3), facing the tapped hole (7) in the nut plate (6), and is adapted to bear against a stop surface of the screw (3) or of the member (1) on which this screw bears, so that the nut plate causes a separation of the branches (10,11) of the attachment member (12) and their abutment against a bearing surface of the other member (2) during screwing, in order to fasten the members to each other, and in that the nut plate (6) comprises two axially offset portions (15,16), an internal one (16) in which the tapped hole (7) is made, and an external one (15) extending at least partly around the internal portion and adapted to abut against a bearing surface of the other member, opposite to that against which the branches of the attachment member abut, in order to allow positional holding of the nut by pinching of the other member between this external portion of the nut plate and the branches of the attachment member.

2. Device according to claim 1, characterised in that the external portion (15) surrounds the internal portion (16), and in that the zones of passage of the branches of the deformable member comprise passage slots (8,9) made between these two portions.

3. Device according to claim 1, characterised in that the external portion (15) of the nut plate comprises at least two opposite fins (15a,15b) which are angularly offset with respect to the passage zones (8,9) for the branches of the attachment member.

4. Device according to claim 1, 2 or 3, characterised in that in the untightened position of the nut each of the branches of the attachment member (12) has, in succession from the intermediate portion (13) of the latter, a first straight part (10a) moving away from the axis of the nut, a second part (10b) curved in the opposite direction from the axis of the nut and engaged in a corresponding zone (8,9) of the nut plate (6), and a third part (10c) which is folded in the direction of the axis of the nut.

5. Device according to claim 4, characterised in that the third part (10c) of each branch (10,11) of the attachment member (12) is folded approximately through 90° with respect to the corresponding end of the second part (10b) of the latter.

* * * * *